United States Patent [19]

Mueller, Jr.

[11] 3,901,323
[45] Aug. 26, 1975

[54] HOUSING FOR A DRAFT CONTROL LINKAGE

[75] Inventor: Otto Mueller, Jr., Detroit, Mich.

[73] Assignee: Massey-Ferguson, Inc., Detroit, Mich.

[22] Filed: July 9, 1973

[21] Appl. No.: 377,850

Related U.S. Application Data

[63] Continuation-in-part of Ser. No. 189,662, Oct. 15, 1971, abandoned.

[52] U.S. Cl. .................................. 172/7; 172/9
[51] Int. Cl. .................................. A01b 63/112
[58] Field of Search ............................ 178/7, 9

[56] References Cited
UNITED STATES PATENTS

| | | | |
|---|---|---|---|
| 2,871,963 | 2/1959 | Harris et al. | 172/9 X |
| 3,042,119 | 7/1962 | Talak | 172/9 |
| 3,106,966 | 10/1963 | Benford | 172/9 |

*Primary Examiner*—Stephen C. Pellegrino
*Attorney, Agent, or Firm*—John L. Shortley; Robert L. Farris

[57] ABSTRACT

A draft and depth control means comprises two divisible portions mounted on a base part and a detachable part of a housing, respectively, with the components of the portions remaining in position on separation of the parts. In the assembled condition the portions are coupled by non-fastening engaging surfaces readily separated on division of the portions. The portion on the detachable part comprises a hydraulic control valve and actuating bell cranks. The portion on the main part includes a control rod and linkages. The linkages comprise a draft control linkage connecting the rod to the draft sensing means, a draft input means setting the draft control linkage to a given height range, an implement position sensing linkage and a maximum depth linkage. A lever is intermediately and pivotally connected to the control rod and the position sensing linkage and the maximum depth linkage pivotally connected to the opposite ends of the lever to limit the implement to a maximum depth.

1 Claim, 8 Drawing Figures

PATENTED AUG 26 1975 3,901,323
SHEET 1 OF 3
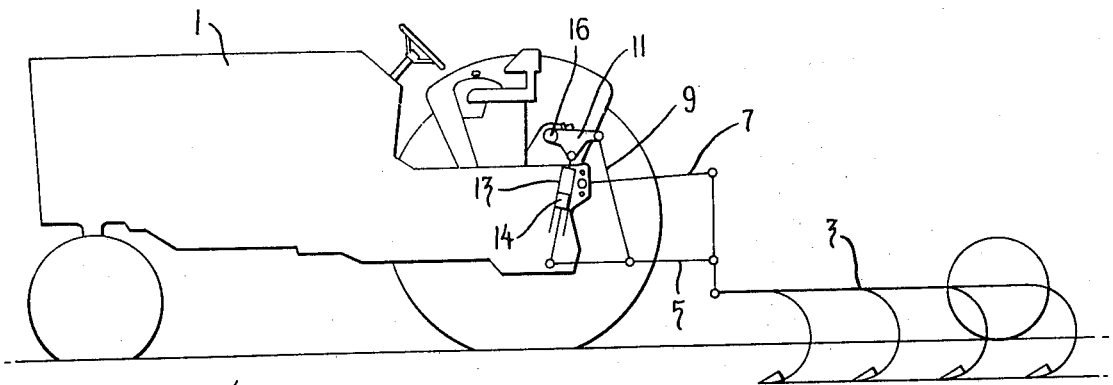
Fig. 1
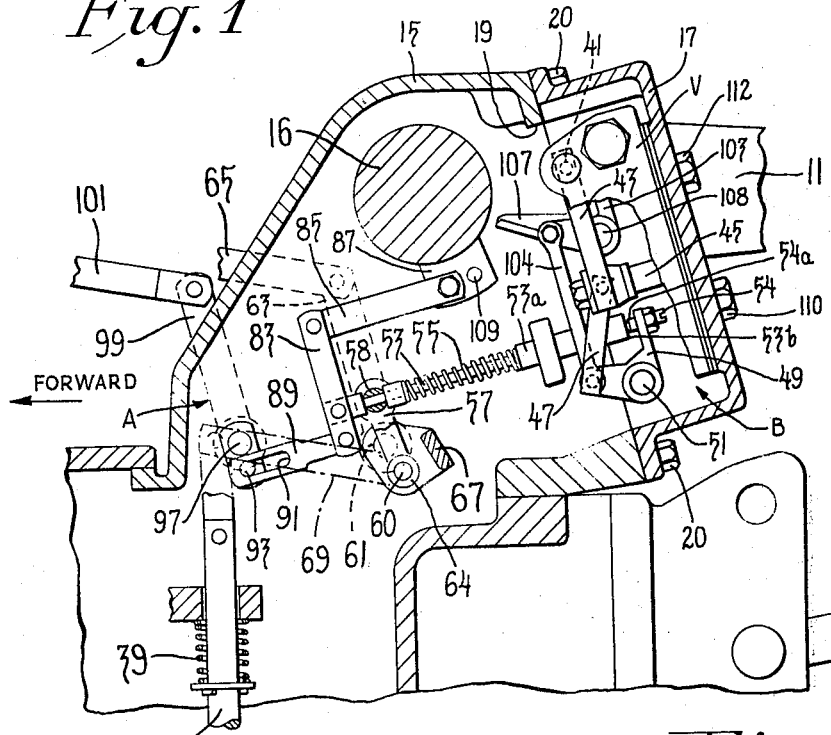
Fig. 2
Fig. 4

HOUSING FOR A DRAFT CONTROL LINKAGE

RELATED APPLICATIONS

This is a continuation-in-part of my copending application Ser. No. 189,662 filed on Oct. 15, 1971, now abandoned, and entitled "Draft Control Linkage for Tractor."

FIELD OF THE INVENTION

This invention relates to tractors of the type equipped with a power elevatable implement hitch linkage and it is more particularly concerned with a housing for a control system of the linkage.

BACKGROUND OF THE INVENTION

Most wheeled tractors, particularly of the agricultural type, utilize a elevatable power three-point hitch for coupling the tractor to implements carried behind the tractor. There generally is a draft sensing means which measures the draft load between the implement and the tractor and which acts through the control system to raise or lower the linkage and the implement so as to maintain a constant draft load. In addition to measuring the draft forces it has become common to utilize the vertical position of the implement as a controlling factor also. This position control may be independent of the draft control or may function simultaneously therewith.

In order to prevent a mounted implement such as a plow from entering too far into the ground upon initial lowering of the implement or other conditions of operation, it is desirable to establish a maximum depth to which the implement can be lowered during operation. It is also desirable to be able for the operator to vary this maximum depth at will. It is also desirable that the raising of the hitch be automatically stopped when it has reached a predetermined height or implement transport position so as to unload the hydraulic system to minimize power loss and excessive heating of the hydraulic fluid caused by constant pumping.

It is therefore an object of the invention to provide a control system for hydraulically operated hitch on a tractor wherein the control system is divisible into two portions for servicing the components of the two portions while the components remain in position in the divisible condition and readily placed in operative association on assemblage.

Another object of the invention is to have the control valve readily accessible without dismantling the control system.

It is a further object of the invention to provide a hitch position sensing member that will positively act on a control valve to positively stop the raising of the tractor hitch when it reaches a predetermined height.

It is a further object of the invention to provide a control system to limit the depth of a tractor drawn implement means mens for sensing the position of the implement and the means for limiting the maximum depth of the implement.

This and other objects and advantages will be apparent from the following specification and attached drawings.

BRIEF DESCRIPTION OF THE DRAWINGS

FIG. 1 is an outline of a tractor and hitch and implement combination on which the invention can be applied;

FIG. 2 is a cross-sectional view through the portion of the tractor and linkage showing a control linkage which operates the hydraulic control valve to control the hitch;

FIG. 3 is a perspective view of the linkage which interconnects a draft sensing unit, the operator controls, a position sensing unit and the control valve;

FIG. 4 is an enlarged view showing details of the portion of the control linkage;

DETAILED DESCRIPTION

Figure 5:
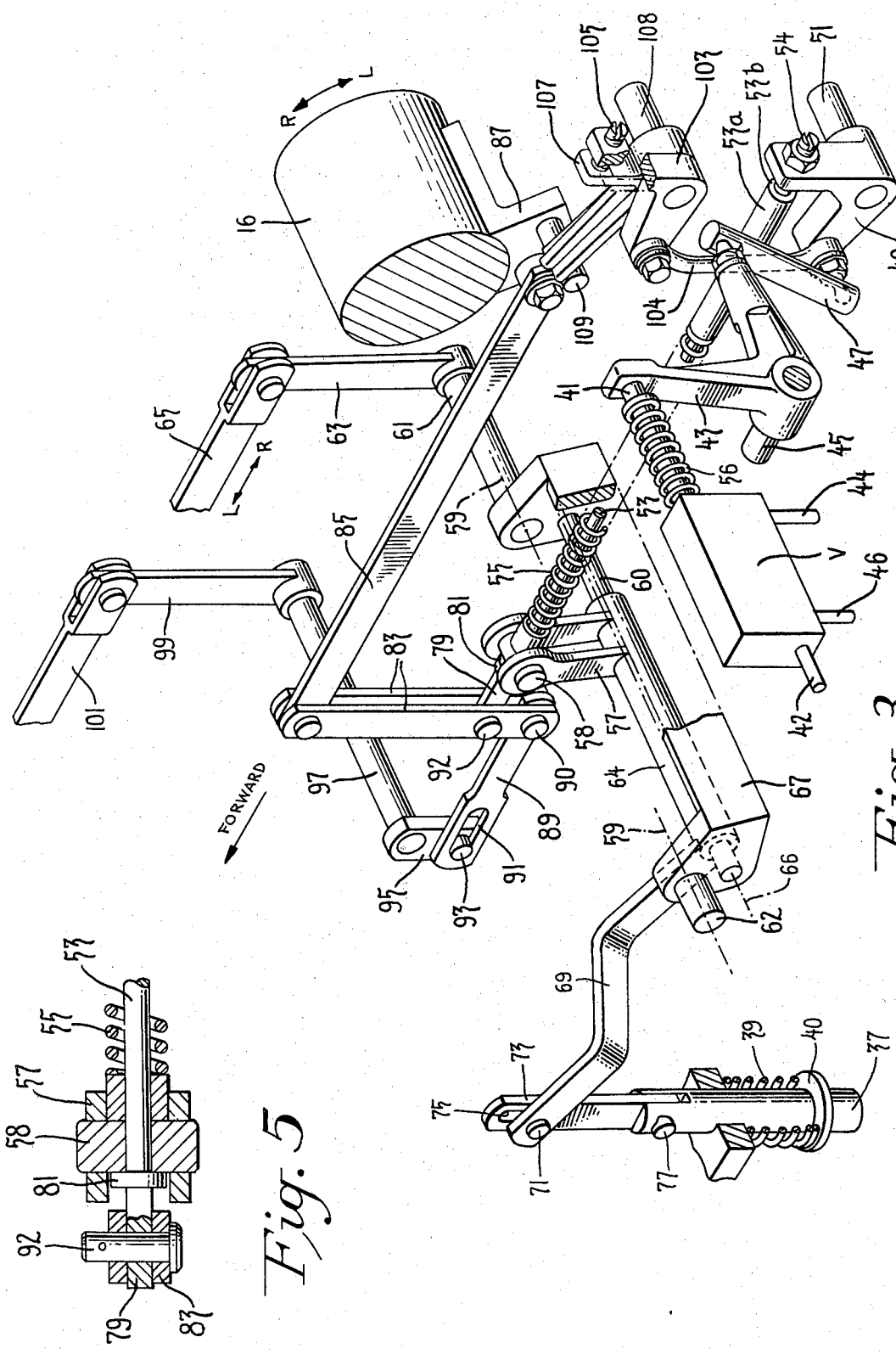
FIG. 5 is another enlarged view showing additional details of the control linkage.

Referring now to the drawings:

FIG. 1 shows a tractor 1 coupled by a hitch or draft linkage to an implement 3. The hitch includes a pair of lower links 5, only one of which is shown, and a top link 7. The links 5 and 7 together comprise a conventional three-point hitch. The lower links 5 are raised by lift links 9 connected to a lift arm 11 secured to a rockshaft 16. The arm 11 is raised by means of a hydraulic unit including a piston 14 operating in a cylinder 13.

The control system is mounted in a housing that comprises a base or main part 15 and a detachable part 17. The base part 15 has a large rear opening 19 extending across the width of the base to provide access for servicing. A detachable part 17 is held on the base or main part by securing means such as bolts 20 threaded into the main part. The directions are taken in relation to facing forward in the direction of travel of the tractor.

The mechanism for controlling the hydraulic means 13–14, and thus the raising and lowering of the linkage, is diagrammatically shown in FIG. 3. Included is a valve V having an inlet 42 connected to a suitable source of pressure, an outlet 44 connected to the hydraulic cylinders 14 and an exhaust or relief 46. The details of the valve V form no part of the invention. The valve V may be of any conventional type and is operated by a plunger shaft 41 which engages a bell crank 43 pivoted on a fixed shaft 45. The spring 56 urges the shaft 41 to the right to raise the hitch. The plunger shaft 41 on movement to the left lowers the hitch. One arm of the bell crank 43 carries, by means of a ball joint, a link 47 which itself is connected at its other end by a ball joint to a second bell crank 49 pivoted on a fixed shaft 51. Movement of the bell crank 49 about the shaft 51 causes corresponding movement of the bell crank 43 about the shaft 45.

The bell crank 49 bears against a control rod 53. A forked operating lever 57 acts against a spring 55 which surrounds the control rod 53 and which bears against an enlarged portion 53a on the rod 53. The crank 49 has an adjusting bolt 54 with a curved surface 54a engaging the flat end surface 53b of the enlarged portion 53a on the rod. The spring 55 on the control rod 53 presses the surfaces together and the contacting surfaces permit separation of the bell crank 49 from the control rod 53 without the unfastening of a connection. This forms a coupling means between the two portions.

The arm 57 is part of the tubular shaft 64 which is rotatably mounted on the shaft 60. This shaft is fixed in the legs of a U-shaped or cradle member 67. On clockwise rotation about axis 66 as viewed in FIGS. 2 and 3, it causes spring 55 to urge the rod 53 rearwardly. The forked arm 57 has a trunnion 58 which presses against spring 55 to urge the rod 53 rearwardly and bears against the fixed flange 81 when moving the rod 53 forward. The member 67 is supported on its legs by shafts 61 and 62 having a common axis 59. The shafts extend through the side walls of the housing 15 on the tractor. The other end of the shaft 61 has a link 63 nonrotatably secured thereto. The link 63 in turn is pivoted to a link 65. The link 65 is connected to a quadrant lever, not shown.

The position of the forked member 57 is controlled by the location of the axis of the shaft 60. In FIG. 4, the member 67 is shown at an intermediate position with the axis 66 of shafts 60 and 64 being at a point $a$. By moving the link 65 to rotate the shaft 61 the shafts 60 and 64 can be swung about to point $b$ or point $c$. In addition to the actual movement of the shafts 60 and 64, the shaft 64 can be rotated about the axis 66 by the arm 69 which is secured thereto. The arm 69 is connected by a pin 71 to a member or link 73. The pin 71 extends through a slot 75 in the member 73. Link 73 is connected by a pin 77 to a plunger 37 which is urged downward by a spring 39 bearing against a large portion 40 on the draft input member 37. Member 37 is connected to a draft sensing device (not shown) which can be of any suitable form but which measures the draft forces on the hitch. This may either be by measuring the force on the top link 7 or the lower links. The member 37 moves downward with increase in the draft load.

Control rod 53 has an extension 79 which is connected to a floating lever 83. The upper portion of the floating lever 83 is pivotally connected to a position sensitive link 85 which in turn is pivotally connected to a flange member 87 attached to the rockshaft 16. Movement of the rockshaft 16 during raising and lowering of the linkage is transmitted through the members 87 and 85 to the floating lever 83. The lower end of the lever 83 is pivotally connected to a link 89 which has a slot 91 formed therein to receive a pin 93 carried on the lower end of a link 95 that is secured to a shaft 97. The shaft 97 carries on its other end a link 99 secured thereto which can be rotated by a link 101 operated by a quadrant lever (not shown) suitably positioned for operation by the tractor operator.

The lever 83 and its connection to the control rod 53, link 101 and link 85 functions as a positioning limiting means. The slot 91 is shown in FIG. 3 in the limiting position. Further lowering of the implement will cause lever 85 to move forward. This causes the actuation of the valve V to raise the implement. The lever 83 will pivot counterclockwise and move the rod 53 forward. The bell crank 43 will permit the shaft 41 to move to the right to limit the fall of the implement.

The flange member 87 carried by the rockshaft 16 carries a pin 109 that acts to engage a bell crank member 107. The member 107 acts through an adjustable screw 105 against a second bell crank member 103 that is connected by a link 104 to the bell crank lever 49 that acts through the link 47 to urge the valve V to neutral position. Resilient means 111 holds the bell crank 107 up and against the bolt 105.

Figure 6:
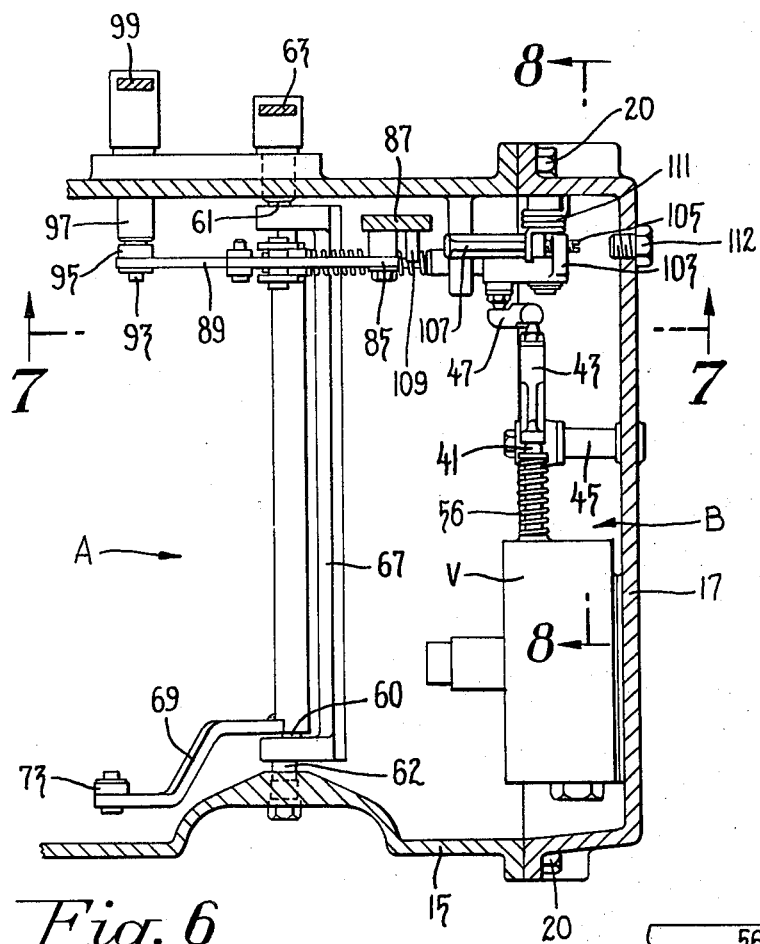
FIG. 6 is a sectional view of the control linkage as viewed from the top.
Figure 7:
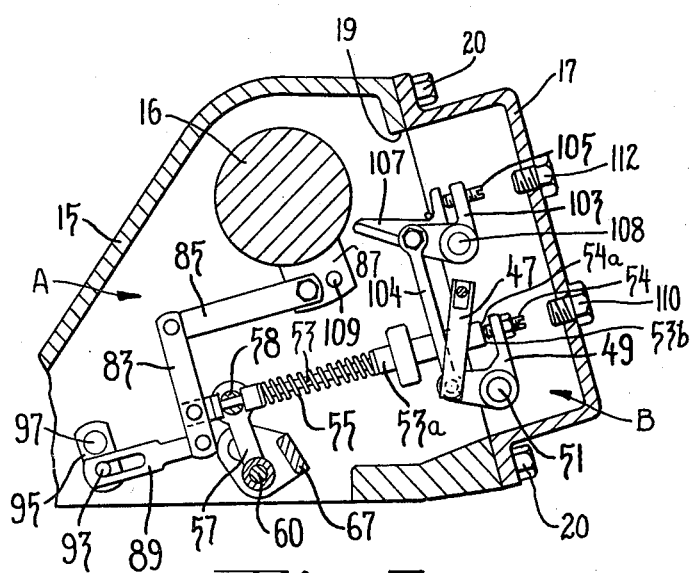
FIG. 7 is a cross-sectional view taken on the lines 7—7 of FIG. 6.
Figure 8:
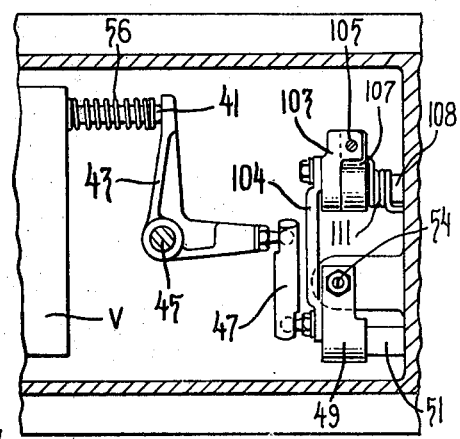
FIG. 8 is a sectional view taken on the line 8—8 of FIG. 6.

The control system is divided into two portions. One portion A, constituting the control rod 53, links 65, 85, 101, member 67 and 37 and the links and levers connected thereto, is supported and mounted on the base or main part 15. This is best shown in FIG. 6. The other portion B is formed by the valve V, bell crank 43, 49 and 107 and is mounted on the detachable part 17.

The shafts 61 and 97 are rotatably mounted in the main part 15 with the link 63, 65, 99 and 101 exterior to the housing and the control rod 53, member 67, arm 69, link 89 and the member 37 within the housing.

The second portion B is mounted on the detachable part 17 and generally comprises the valve V and bell cranks 43, 49, 103, 107. The fixed shaft 45 that pivotally supports the bell crank 43 is mounted on the back wall of the detachable part 17. The bell crank 43 engages the plunger shaft 41 which extends parallel to the back wall. The shafts 51 and 108 are mounted on the end wall of the detachable part. The shaft 51 pivotally supports bell crank 49 and shaft 108 pivotally supports bell cranks 103 and 107.

The control rod 53 extends fore and aft and has, as previously described, a rearwardly facing surface 53$b$ which engages a forwardly facing curved surface 54$a$ on the bolt 54. These surfaces, the bell crank member 107, and the pin 109 intercouple the two portions and, as seen from the drawings, these may be separated without disturbing the position of the two portions. The control rod 53 and bolt 54 can be moved in and out of engagement without the unfastening of any connecting means. The bell crank 107 and pin 109 can correspondingly be separated by simple movement.

The operation of the control linkage is as follows: Assuming that the implement is in a raised condition and the operator wishes to lower the same, he operates his quadrant lever to control the draft setting. To lower the implement, link 65 is moved forward, as viewed in the figures, to cause the shaft 61 to rotate counterclockwise and thus rotate the cradle 67 counterclockwise about its axis 59. This will cause the shaft 60 carried in the member 67 to be moved rearward from position $a$ to position $b$ and simultaneously urge the control rod 53 rearward through the spring 55. This motion is transmitted through the bell crank lever 49 link 47 and bell crank 43 to the valve operating rod 41, to urge the valve against its spring, into a position to allow the implement to be lowered.

As the implement enters the ground, a draft force is exerted upon the linkage and this draft force will, as measured by the suitable measuring device, cause the draft input member 37 to be moved downward as viewed in the figures. This downward movement acts through the links 73, pin 71 and lever 69 to rotate the shaft 64 counter-clockwise acting to relieve the force through spring 55 on the member 53 to gradually allow the valve V to close. When the draft forces have increased, due to the lowering of the implement into the ground, to a point, as predetermined by the setting of the lever 65, member 60 will have moved sufficiently to cause the member 57 to return to the position as shown in FIG. 4, which represents a neutral position wherein oil is neither flowing into or out of the cylinders.

Prior to lowering of the implement, the operator has preconditioned the lever 101 to a position corresponding to the maximum depth at which he wishes the implement to operate. This acts through the links 99, 95, pin 93 and link 89 to locate the lower pin 90 of the floating lever 83. As the implement is lowered, the rockshaft 16 rotates counterclockwise, as viewed in the figures, causing the lever 85 to move forward. Through the intermediate pin 92 the extension 79 on the control rod 53 is moved forward and when the minimum depth selected by the operator is reached, the valve will be in a neutral position wherein oil is neither flowing into or out of the cylinders. It thus can be seen that both the draft force on the hitch and the position of the hitch affect the operation of the valve. The position control acts merely as a limit to the depth; whereas, the draft control acts as a constant control over the depth of the implement. In effect the position control acts as a variable stop through the medium of pin 93, to limit the rearward movement of the control rod 53, and upon reaching the predetermined depth causes the control rod to move to its neutral valve position.

As the draft forces change during operation of the implement, the draft sensitive member 37 moves up and down to cause the lever 69 to rotate the shaft 60 and to operate the control rod 53. Control of the valve to open and close to raise and lower the implement to maintain a constant draft force is thus predetermined by the setting of the lever 65. If the position floor, as set by lever 101, is such that the valve is returned to neutral before the depth is reached that would produce the draft force acting through the member 37 sufficient to move the valve to a neutral position, the rod 53 will be compressed.

When the operator wishes to raise the implement out of the ground, he operates the lever 65 rearward, as viewed in the figures, to cause the shaft 61 to rotate clockwise which causes forward movement of the forked member 57 thereby moving the control rod 53 forward and through the bell crank 49, lever 47 and bell crank 43, permit the valve to be moved to its raised position allowing oil to flow into the cylinders raising the implement. As the implement is raised, the rockshaft 16 rotates counterclockwise, and when a maximum transport position is reached the pin 109 engages the arm of the bell crank 107. This action through the adjustable screw 105, urges the bell crank 103 clockwise to raise the lever 104 and cause the bell crank 43 to move the valve control rod 41 to its neutral position cutting off the flow to the cylinders and hence the raising of the implement. The hydraulic fittings (not shown) for the valve V are mounted on the detached part 17. From the description it is seen that the portions are in a force transmitting relation.

The bolts 54 and 105 are accessible for adjustment by a tool through openings in the rear wall of the detachable part 17. The openings are closed by threaded plugs 110 and 112.

The slot 91 in the lever 89 permits the position control linkage to operate during the normal operation, i.e., allowing the link 85 to move back and forth to pivot the floating lever 83 about pin 92 to cause link 89 to move back and forth with the pin 93 in the slot 91. Movement of the lever 89 rearward is restricted by the position of the pin 93 as set by the lever 101, but movement of the lever forward is unrestricted. The slot 75 in the lever 73 performs a similar function in that it permits the lever 69 to move upward with the pin 71 moving in the slot 75.

It will be seen that a control linkage for a tractor will permit the operator to establish whatever draft force he wishes without interference of a position control. At the same time he can establish the maximum depth that the implement will operate. This is particularly important to prevent the implement from going too deep into the ground upon originally entering the ground, wherein the front portion such as the plow bottoms do not provide sufficient draft force in themselves to cause the mechanism to stop the lowering of the implement and the subsequent entering of the rear portion of the implement has not had the effect on the draft responsive member that it will have when the implement reaches its proper depth. By being able to establish the floor or minimum position to which the implement will go, the operator can insure that the implement will not be too deep into the ground.

It is further seen that the control system is uniquely mounted and housed. The housing for the control system has a rear opening completely covered by the detachable part or cover 17 of the housing. The opening 19 provides ample access to the portion within the base or main part 15. The valve V mounted on the detachable part provides ready access to the valve for adjustment, repair or replacement. A feature of this invention is that this may be done without disturbing the components of the control system.

I claim:

1. In a tractor having a draft linkage for connecting the tractor to an implement, hydraulic means for raising and lowering said draft linkage, draft sensing means for measuring changes in draft loads applied to said draft linkage, control means coupled to said draft sensing means and including a control valve connected to said hydraulic means for controlling the actuating of the hydraulic means in response to said draft sensing means, a housing having a main part and a detachable part with means for securing said detachable part to said main part on assemblage, characterized by said control means being divisible into two portions, one of said portions being mounted on said detachable part in operative relation with said control valve also mounted on said detachable part, said portions remaining in position in the divisible condition and being movable in and out of assemblage with the main part, support means supporting the portion of said control means mounted on said main part and the portion of said control means mounted on said detachable part, on said main part and on said detachable part respectively, to permit movement of said portions into and out of engagement with each other when said main part and said detachable part are in and assembled condition, and resilient means included in said control means for biasing said portions of said control means toward contact with each other when said main part and said detachable part are in an assembled condition.

* * * * *